US009678516B2

(12) United States Patent
Fan et al.

(10) Patent No.: US 9,678,516 B2
(45) Date of Patent: Jun. 13, 2017

(54) BALANCED REGULATOR HAVING A BALANCED TRIM INCLUDING A VARIABLE PRESSURE SENSE AREA

(71) Applicant: EMERSON PROCESS MANAGEMENT REGULATOR TECHNOLOGIES, INC., McKinney, TX (US)

(72) Inventors: Guolei Fan, Chengdu (CN); Biao Zhou, Chengdu (CN); Nian Chun Liu, Sichuan (CN); Jing Zhang, Sichuan (CN); Yang He, Sichuan (CN); Tung K. Nguyen, McKinney, TX (US)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 142 days.

(21) Appl. No.: 14/625,006

(22) Filed: Feb. 18, 2015

(65) Prior Publication Data
US 2015/0234395 A1    Aug. 20, 2015

(30) Foreign Application Priority Data

Feb. 20, 2014  (CN) .......................... 2014 1 0059808
Feb. 20, 2014  (CN) ..................... 2014 2 0075971 U (51) Int. Cl.
*F16K 31/12*   (2006.01)
*G05D 16/10*  (2006.01)

(52) U.S. Cl.
CPC ...... *G05D 16/106* (2013.01); *Y10T 137/7801* (2015.04)

(58) Field of Classification Search
CPC .............. G05D 16/0638; G05D 16/065; Y10T 137/7801
See application file for complete search history.

(56) References Cited

U.S. PATENT DOCUMENTS 3,425,442 A  2/1969  Johnson et al.
8,469,052 B2 *  6/2013  Jorgensen ............ G05D 7/0106
                                                            137/495

(Continued)

FOREIGN PATENT DOCUMENTS

CN   203189820 U   9/2013

OTHER PUBLICATIONS

Search Report for International application No. PCT/US2015/014714, dated Apr. 28, 2015.

(Continued)

*Primary Examiner* — R. K. Arundale
(74) *Attorney, Agent, or Firm* — Marshall, Gerstein & Borun LLP (57) ABSTRACT

A balanced pressure regulator includes a valve body having a fluid inlet and a fluid outlet connected by a fluid passageway. A valve seat is disposed within the fluid passageway. A balanced plug assembly is disposed within the fluid passageway, the balanced plug assembly including a valve plug that cooperates with the valve seat to selectively open or close the fluid passageway, a retainer operatively connecting the valve plug to a valve stem, a diaphragm separating a chamber from the fluid passageway, a central balancing passage that fluidly connects the fluid passageway with the chamber, and a peripheral balancing passage that fluidly connects the fluid passageway with the chamber, the peripheral balancing passage being located between the retainer and the valve plug.

18 Claims, 7 Drawing Sheets

(56) References Cited

U.S. PATENT DOCUMENTS

| | | | |
|---|---|---|---|
| 2008/0257421 A1* | 10/2008 | Kranz | F16K 17/32 137/461 |
| 2009/0261281 A1* | 10/2009 | Mevius | F16K 31/165 251/118 |
| 2010/0071786 A1 | 3/2010 | Hawkins et al. | |
| 2014/0083530 A1* | 3/2014 | Fan | G05D 16/0663 137/505.18 |
| 2014/0090719 A1* | 4/2014 | Mevius | F16K 17/02 137/15.24 |
| 2014/0090727 A1* | 4/2014 | Nguyen | G05D 16/0694 137/505.18 |
| 2014/0261724 A1* | 9/2014 | Fan | F16K 31/1262 137/15.01 |
| 2015/0355642 A1* | 12/2015 | Sanders | G05D 7/012 137/484.2 |

OTHER PUBLICATIONS

Written Opinion for International application No. PCT/US2015/014714, dated Apr. 28, 2015.
International Preliminary Report on Patentability for International application No. PCT/US2015/014714, issued Aug. 23, 2016.

* cited by examiner

BALANCED REGULATOR HAVING A BALANCED TRIM INCLUDING A VARIABLE PRESSURE SENSE AREA

FIELD OF THE DISCLOSURE

The disclosure generally relates to balanced pressure regulators and more specifically to balanced pressure regulators having a balance trim including a variable pressure sense area.

BACKGROUND OF THE DISCLOSURE

Pressure regulating valves are used in myriad industrial and residential applications for controlling the downstream pressure of a fluid. For example, in chemical processing plants or oil refineries, pressure regulating valves are used to manipulate a flowing fluid to compensate for increases or decreases in demand, or other load disturbances, and thus keep the fluid pressure regulated. Similarly, pressure regulating valves may be used in plumbing fixtures to maintain a pre-determined pressure of fluid that automatically adjusts to variations in demand, such as anti-scald valves in showers or faucets. By controlling downstream pressure, pressure regulating valves compensate for variations in downstream demand. For example, as downstream demand increases, pressure regulating valves open to allow more fluid to flow through the pressure regulating valve, thus maintaining a relatively constant downstream pressure. On the other hand, as downstream demand decreases, pressure regulating valves close to reduce the amount of fluid flowing through the pressure regulating valve, again maintaining a relatively constant downstream pressure.

Pressure regulating valves can be categorized as either balanced or unbalanced. Unbalanced valves typically have high pressure inlet fluid on one side of the valve plug and lower pressure outlet fluid on the other side of the valve plug. Unbalanced valves suffer from an undesirable effect known as decaying inlet characteristic. The decaying inlet characteristic is a phenomenon in which an unbalanced valve experiences an unintended increase in downstream pressure as the upstream pressure decreases. This effect is undesirable as most pressure regulating valves attempt to maintain a constant downstream pressure. Decaying inlet characteristic is caused by fluid forces on the high pressure side of the valve plug attempting to move the valve plug to a closed position. As a result, the valve must have some mechanism to oppose this fluid force on the valve plug. Because the mechanism that opposes the fluid force typically has a set point, the force generated by such a mechanism is constant while the fluid force on the inlet side of the valve plug may vary (e.g., due to a decreasing supply of inlet fluid, or due to pressure variations upstream of the valve). Decaying inlet characteristic is particularly important to applications having a limited compressed fluid source, such as gas cylinders, tube trailers, or hydrils, because in such applications, there is a fixed supply of inlet fluid and thus, the inlet fluid pressure decreases as the inlet fluid supply decreases.

Unbalanced valves also suffer from damage that occurs to the valve seat. In unbalanced valves with high inlet pressures, the fluid pressure acting on large valve orifices can crush the valve seat. As a result, unbalanced valves are not ideal for high pressure, large orifice applications.

To address the decaying inlet characteristic in higher flow applications, balanced pressure regulators were developed. In the balanced pressure regulator, a portion of the upstream pressure is diverted to act on a downstream portion of the valve plug. Thus, the valve plug is "balanced," having the same fluid pressure act on both upstream and downstream portions of the valve plug. In this way, the decaying inlet characteristic is eliminated (or greatly reduced) because there is no difference in the fluid forces acting on valve plug surfaces both upstream and downstream of the valve seat that would tend to force the valve plug towards the closed position. In other words, the valve plug itself generates very little, or no opening/closing forces due to fluid pressures.

In diaphragm-type pressure regulators, higher pressure fluid from an upstream or inlet side of the valve plug may be vented through the valve plug to an opposite side of the diaphragm to balance forces on the valve plug, similar to the balanced regulators described above. Typically, this balancing of fluid forces is accomplished by incorporating one or more vent channels or ports that extend through the valve plug from the inlet side to an actuator side of the diaphragm.

Figure 1:
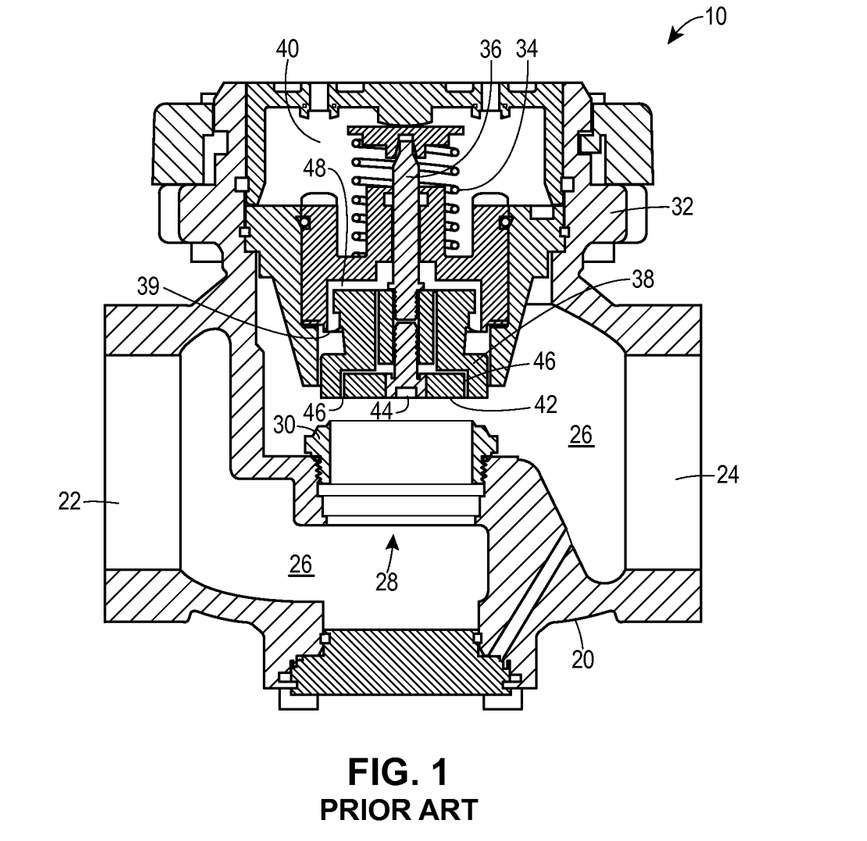
FIG. 1 is a cross-sectional view of a prior art edge sense balanced regulator.

A typical edge sense diaphragm-type pressure regulator is illustrated in FIG. 1. The pressure regulator 10 includes a valve body 20 having a fluid inlet 22 and a fluid outlet 24 that are fluidly connected by a passage 26. The passage 26 includes a throat 28 in which a valve seat 30 is disposed. A bonnet 32 houses a load spring 34 that is connected to a valve stem 36. The valve stem 36 is operatively attached to a valve plug 38. The valve plug 38 interacts with the valve seat 30 to control fluid flow through the valve body 20 from the inlet 22 to the outlet 24.

A diaphragm 39 is connected to the bonnet 32 and to the valve plug 38. The diaphragm 39 separates the passage 26 from a cavity 40 in the bonnet 32 that contains the load spring 34. The diaphragm 39 is responsive to pressure differences between the passage 26 and the cavity 40.

A retainer 42 is attached to the valve stem 36 and retains the valve plug 38 on the valve stem 36. The retainer may include one or more fasteners 44, which are attached to the valve stem 36. One or more balancing passages or channels 46 fluidly connect the passage 26 with a chamber 48 located between the valve plug 38 and the cavity 40. Fluid forces on the valve plug 38 are balanced by fluid moving through the balancing channels 46. In the edge sense diaphragm-type regulator 10 illustrated in FIG. 1, the balancing channels 46 are located radially outward from a center of the retainer 42. The balancing channels 46 may be a series of discrete channels, or a single annular channel. Edge sense diaphragm-type regulators suffer from high boost at high inlet pressures, which results in an undesirable reduction in flow capacity at high inlet pressures.

Figure 2:
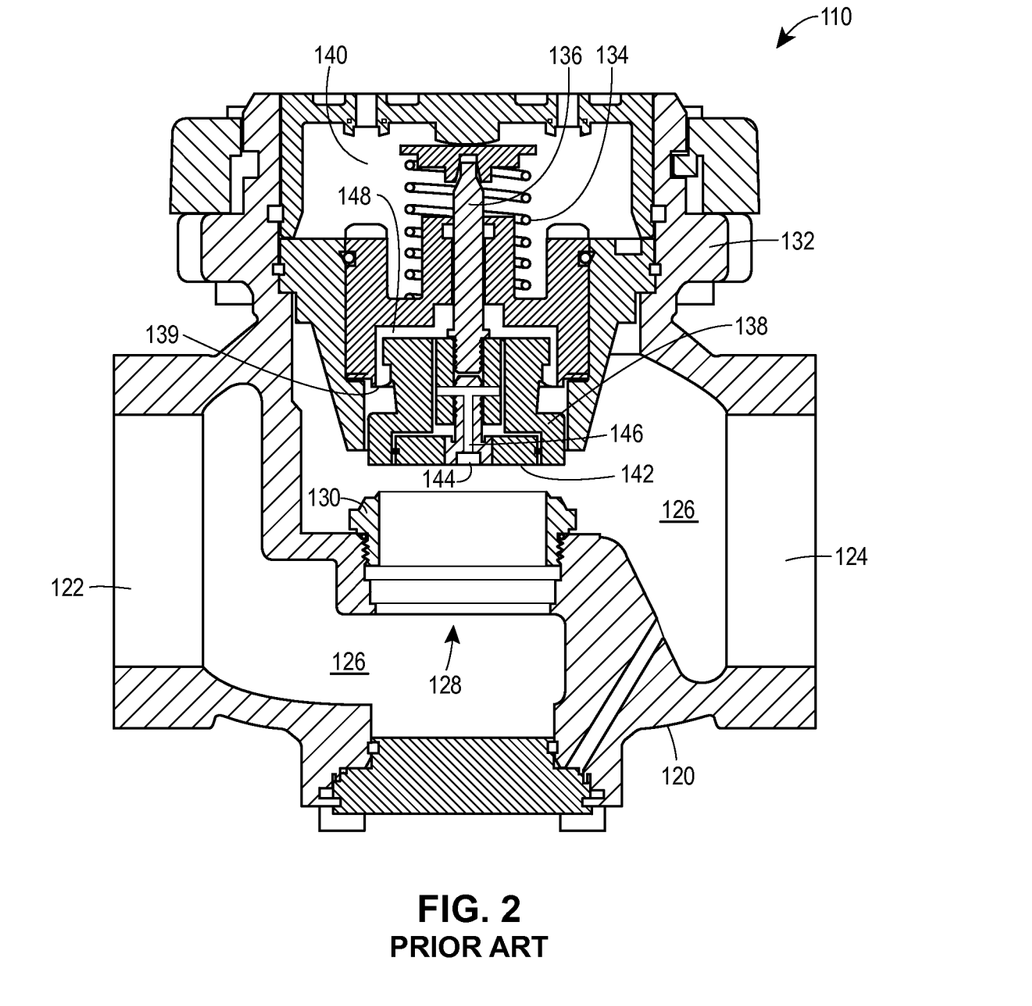
FIG. 2 is a cross-sectional view of a prior art center sense balanced regulator

A typical center sense diaphragm-type pressure regulator is illustrated in FIG. 2. The pressure regulator 110 includes a valve body 120 having a fluid inlet 122 and a fluid outlet 124 that are fluidly connected by a passage 126. The passage 126 includes a throat 128 in which a valve seat 130 is disposed. A bonnet 132 houses a load spring 134 that is connected to a valve stem 136. The valve stem 136 is operatively attached to a valve plug 138. The valve plug 138 interacts with the valve seat 130 to control fluid flow through the valve body 120 from the inlet 122 to the outlet 124.

A diaphragm 139 is connected to the bonnet 132 and the valve plug 138. The diaphragm 139 separates the passage 126 from a cavity 140 in the bonnet 132 that contains the load spring 134. The diaphragm 139 is responsive to pressure differences between the passage 126 and the cavity 140.

A retainer 142 is attached to the valve stem 136 and retains the valve plug 138 on the valve stem 136. The retainer may include one or more fasteners 144, which are attached to the valve stem 136. A central balancing passage or channel 146 fluidly connects the passage 126 with a chamber 148 located between the valve plug 138 and the cavity 140. Fluid forces on the valve plug 138 are balanced by fluid moving through the balancing channel 146. The balancing channel 146 differs from the balancing channels 146 of FIG. 1 in that the center sense balancing channel 146 is more or less centered in the retainer 142 and includes only one primary balancing channel 146. Center sense diaphragm-type balanced regulators suffer from high droop at low inlet pressures, which results in a loss of flow capacity at low inlet pressures.

SUMMARY

In accordance with one exemplary aspect of the present invention, a balanced pressure regulator includes a valve body having a fluid inlet and a fluid outlet connected by a fluid passageway. A valve seat is disposed within the fluid passageway. A balanced plug assembly is disposed within the fluid passageway, the balanced plug assembly including a valve plug that cooperates with the valve seat to selectively open or close the fluid passageway, a retainer operatively connecting the valve plug to a valve stem, a diaphragm separating a chamber from the fluid passageway, a central balancing passage that fluidly connects the fluid passageway with the chamber, and a peripheral balancing passage that fluidly connects the fluid passageway with the chamber, the peripheral balancing passage being located between the retainer and the valve plug.

In another exemplary aspect of the present invention, a balanced plug assembly includes a valve plug that cooperates with the valve seat to selectively open or close the fluid passageway, a retainer operatively connecting the valve plug to a valve stem, a diaphragm separating a chamber from the fluid passageway, a central balancing passage that fluidly connects the fluid passageway with the chamber, and a peripheral balancing passage that fluidly connects the fluid passageway with the chamber, the peripheral balancing passage being located between the retainer and the valve plug.

In further accordance with any one or more of the foregoing aspects, a balanced pressure regulator and/or a balanced plug assembly may further include any one or more of the following preferred forms.

In some preferred forms, the balanced pressure regulator and/or the balanced plug assembly may include a retainer that is movable relative to the valve plug along a longitudinal axis of the valve stem.

In other preferred forms, the retainer may be attached to the valve stem with a fastener.

In other preferred forms, the balanced pressure regulator and/or the balanced plug assembly may include a central balancing passage extends through the fastener.

In other preferred forms, the balanced pressure regulator and/or the balanced plug assembly may include a pressure sensing spring disposed between the retainer and the valve plug.

In other preferred forms, the pressure sensing spring biases the retainer away from the valve plug.

In other preferred forms, the balanced pressure regulator and/or the balanced plug assembly may include a plug spring seat disposed between the retainer and the valve plug.

In other preferred forms, the plug spring seat may include a balancing passageway.

In other preferred forms, the retainer may include an outwardly extending flange.

In other preferred forms, the outwardly extending flange may include a chamfered surface.

In other preferred forms, the valve plug may include a central bore having a first portion with a first diameter and a second portion having a second diameter, the first diameter being larger than the second diameter.

While the disclosure is susceptible to various modifications and alternative constructions, certain illustrative embodiments thereof have been shown in the drawings and will be described below in detail. It should be understood, however, that there is no intention to limit the disclosure to the specific forms disclosed, but on the contrary, the intention is to cover all modifications, alternative constructions, and equivalents falling within the spirit and scope of the invention.

DETAILED DESCRIPTION

Referring now to the drawings and with specific reference to FIGS. 3-6, a balanced pressure regulator assembly is generally referred to by reference numeral 211, 311. The balanced pressure regulator assemblies 211, 311, illustrated in FIGS. 3-6 may be used in regulator valves having valve bodies and bonnets, similar to those illustrated in FIGS. 1 and 2. Where the balanced pressure regulator assemblies of FIGS. 3-6 include elements that correspond to the elements of the balanced pressure regulators of FIG. 1 or 2, those elements will be numbered similarly, the only difference being that the reference numerals of FIGS. 3-6 being increased by a multiple of 200 or 300 from elements of FIG. 1 and a multiple of 100 or 200 from similar elements in FIG. 2. For example, corresponding elements of FIGS. 3 and 4 will be numbered exactly 100 greater than the corresponding elements illustrated in FIG. 1. Similarly, corresponding elements of FIGS. 5 and 6 will be numbered exactly 200 greater than the corresponding elements illustrated in FIG. 1.

Figure 3:
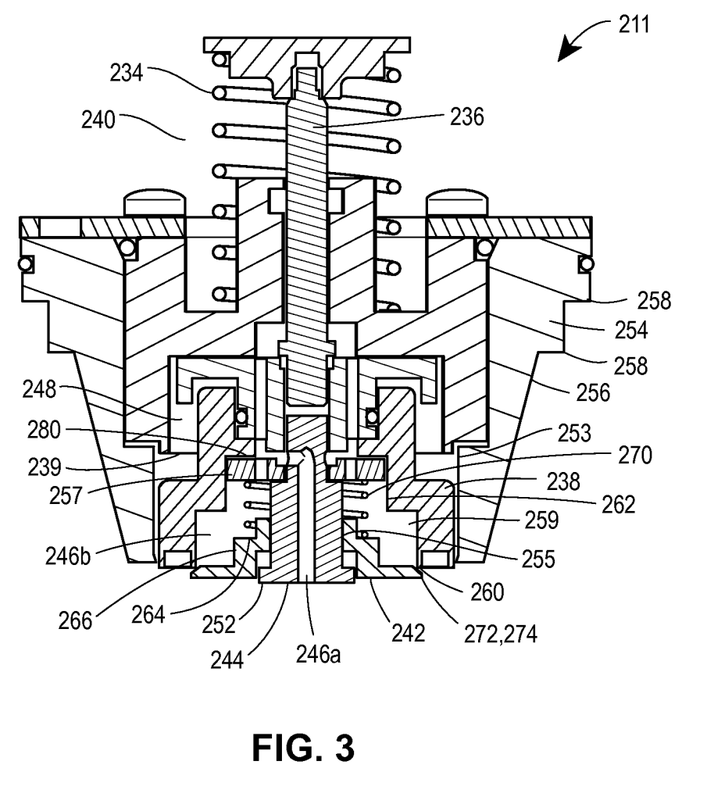
FIG. 3 is a cross-sectional view of a balanced regulator having a variable pressure sense area that is constructed in accordance with the teachings of the disclosure.
Figure 4:
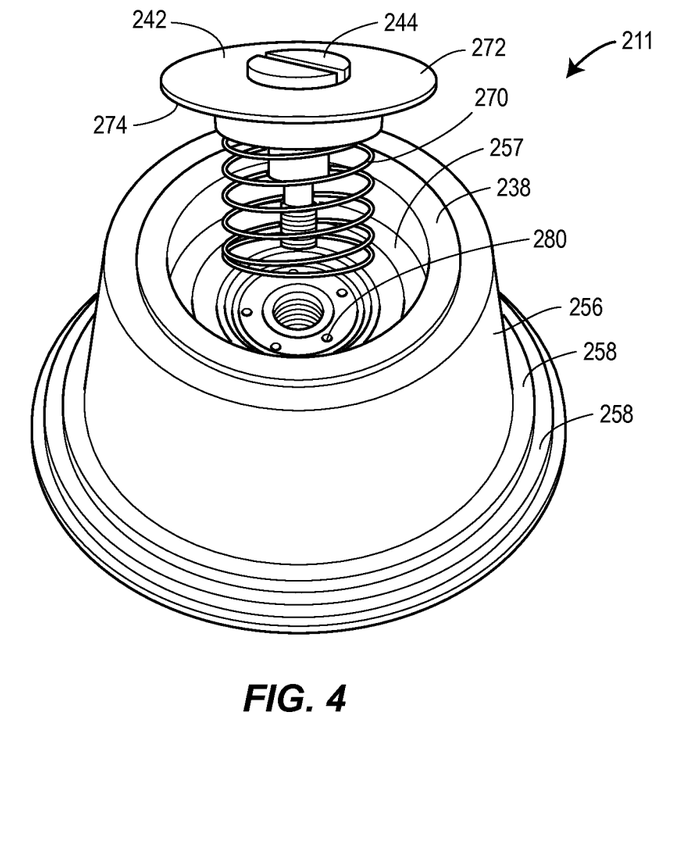
FIG. 4 is a perspective view of a valve plug and a retainer of the balanced regulator of FIG. 3.

Turning now to FIGS. 3 and 4, the balanced pressure regulator assembly 211 includes a valve stem 236 operatively attached to a valve plug 238. The valve plug 238 interacts with a valve seat to control fluid flow through a valve body.

The balanced plug assembly 211 includes a sleeve 254. The valve plug 238 is operatively secured to the valve stem 236 with a retainer 242. The sleeve 254 has a hollow bore 253 that retains and guides the valve plug 238 as the valve plug 238 reciprocates to control fluid flow. The sleeve 254 may have an angled outer surface 256 to enhance clearance within the valve body and/or to enhance assembly of the balanced pressure regulator. The sleeve 254 may also include one or more outer annular shoulders 258 that may be clamped between a bonnet and the valve body to locate and retain the sleeve 254 within the valve body.

A diaphragm 239 is connected to the sleeve 254 and to the valve plug 238. The diaphragm 239 separates a passage within the valve body from a cavity 240 between the balanced pressure regulator assembly 211 and the bonnet that contains a load spring 234. The diaphragm 239 is responsive to pressure differences between the passage within the valve body and the cavity 240.

The retainer 242 is attached to the valve stem 236 and operatively connects the valve plug 238 to the valve stem 236. The retainer 242 may include one or more fasteners 244, such as a nut, which are operatively connected to the valve stem 236. A center balancing passage channel 246a extends through at least one of the fastener 244 and the retainer 242 to fluidly connect the fluid passageway with a chamber 248 located between the valve plug 238 and the cavity 240. One or more peripheral balancing passages 246b are located between the retainer 242 and the valve plug 238 to fluidly connect the fluid passageway with the chamber 248. The peripheral balancing passages 246b vary in size, depending upon an inlet pressure, which will be discussed further below. Fluid forces on the valve plug 238 are balanced by fluid moving through the balancing channels 246a, 246b from higher pressure regions to lower pressure regions.

The retainer 242 is slidably attached to the fastener 244 so that the retainer 242 is longitudinally slidable within the valve plug 238. The fastener 244 includes an annular flange 252 to prevent the retainer 242 from sliding off of the fastener 244. The retainer 242 includes a hollow bore 255 that is sized and shaped to receive an outer surface of the fastener 244. A plug spring seat 257 is located between the retainer 242 and the valve plug 238 in a chamber 259 formed between the retainer 242 and the valve plug 238. The chamber 259 includes a first portion 260 and a second portion 262, the first portion 260 having a first diameter and the second portion 262 having a second diameter that is different from the first diameter. In some embodiments, the first diameter is larger than the second diameter. The plug spring seat 257 is disposed in the second portion 262. While the plug spring seat 257 is illustrated as being a separate element from the valve plug 238, in other embodiments, the plug spring seat 257 could be integrally formed with the valve plug 238.

The retainer 242 includes a retainer spring seat 264 formed on an outer surface thereof. The retainer spring seat 264 may be formed by a seat shoulder 266 that extends radially outward, away from the hollow bore 255. A pressure sensing spring 270 is disposed between the plug spring seat 257 and the retainer spring seat 264. The pressure sensing spring 270 biases the retainer 242 away from the plug spring seat 257. A peripheral annular flange 272 extends radially outward, away from the retainer 242. In some embodiments, the peripheral annular flange 272 includes a chamfered surface 274 that has a largest diameter distal to the plug spring seat 257 and a smallest diameter proximate the plug spring seat 257. The largest diameter of the peripheral annular flange 272 is substantially equal to the first diameter of the first portion 260 of the chamber 259 so that when the peripheral annular flange 272 is located within the first portion 260, fluid is prevented from flowing between the retainer 242 and the valve plug 238. On the other hand, when the peripheral annular flange 272 is located outside of the first portion 260 (e.g., when the pressure sensing spring 270 pushes the retainer 242 away from the valve plug 238), a gap exists between the peripheral annular flange 272 and the valve plug 238, which allows fluid to flow through the peripheral balancing passages 246b and into the chamber 259.

The pressure sensing spring 270 may be set so that the retainer 242 is biased to an open position, where the peripheral annular flange 272 is located completely outside of the chamber 259 at a minimum or low inlet pressure. This position corresponds to a fully open position that allows fluid to flow through the center balancing channel 246a and through the peripheral balancing channels 246b, which results in low droop at low inlet pressures. As a result, the disclosed balanced plug assembly 211 has increased fluid capacity at low inlet pressures relative to known center-sense balanced pressure regulators.

As fluid pressure at the inlet increases, a closing force will be generated by the fluid pressure pressing on the outer surface of the retainer 242. As the closing force begins to overcome the spring force generated by the pressure sensing spring 270, the retainer 242 will begin to move towards the plug spring seat 257. As the retainer 242 moves towards the plug spring seat 257, the peripheral annular flange 272 will enter the chamber 259 and eventually seats against the valve plug 238. As the peripheral annular flange 272 enters the chamber 259, fluid flow through the peripheral balancing channels 246b will be reduced and eventually stopped as the peripheral annular flange 272 becomes seated against the valve plug 238. The chamfered surface of the peripheral annular flange 272 provides a gradually decreasing size of the peripheral balancing channels 246b as the retainer 242 moves towards a closed position. In one embodiment, the chamfered surface 274 may be angled between 30° and 60° relative to the valve stem 236. At the fully closed position, wherein the peripheral annular flange 272 is fully seated within the chamber 259, fluid flow is prevented from flowing through the peripheral balancing channels 246b, transitioning the balanced plug assembly 211 into a center sense only assembly. As a result, the disclosed balancing plug assembly 211 has low boost at high inlet pressures, which provides for increased fluid flow capacities at high inlet pressures relative to known edge-sense balanced pressure regulators.

In some embodiments, the plug spring seat 257 may include one or more balancing passageways 280 that allow fluid to flow from the chamber 259 to the chamber 248. Similarly, the central balancing passage 246a may be fluidly connected to the chamber 248 to allow fluid to flow into the chamber 248. Generally speaking, the central balancing passage 246a is always open, thereby allowing fluid to flow between the passageway in the valve body and the chamber 248, which balances fluid pressure in those regions. One other hand, the peripheral balancing passages 246b may be opened or closed depending upon the inlet pressure and the pressure sensing spring 270.

Figure 5A:
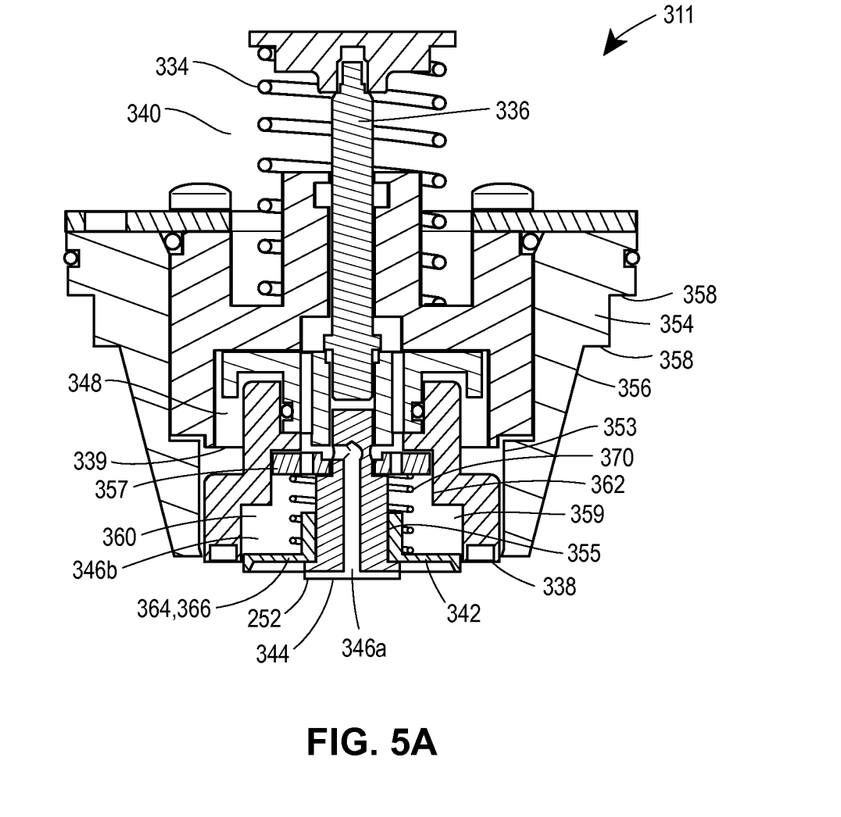
FIG. 5A is a cross-sectional view of an alternate embodiment of a balanced regulator having a variable pressure sense area that is constructed in accordance with the teachings of the disclosure.
Figure 5B:
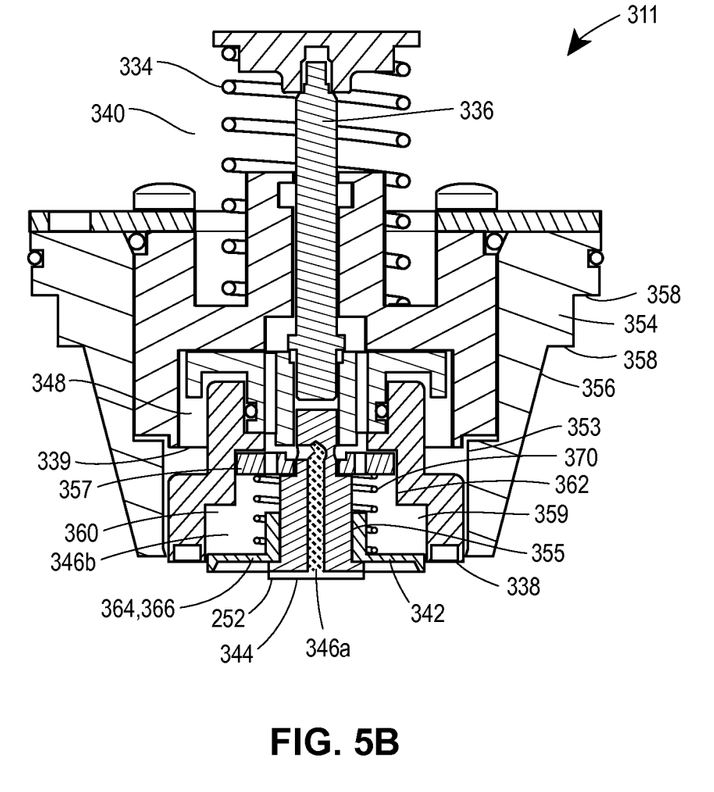
FIG. 5B is a cross-sectional view of the alternate embodiment of FIG. 5A with a center balancing passage channel being blocked.
Figure 6:
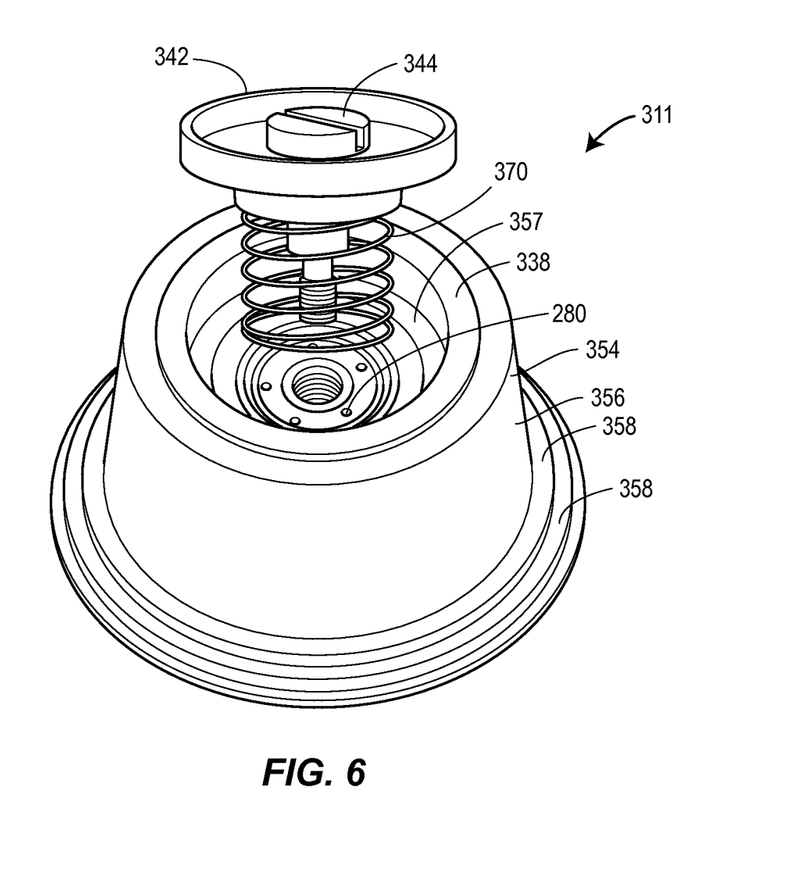
FIG. 6 is a perspective view of a valve plug and a retainer of the balanced regulator of FIG. 5A.

Turning now to FIGS. 5A, 5B, and 6, another embodiment of a balanced pressure regulator assembly 311 includes a valve stem 336 operatively attached to a valve plug 338. The valve plug 338 interacts with a valve seat to control fluid flow through a valve body.

The balanced plug assembly 311 includes a sleeve 354. The valve plug 338 is operatively secured to the valve stem 336 with a retainer 342. The sleeve 354 has a hollow bore 353 that retains and guides the valve plug 338 as the valve plug 338 reciprocates to control fluid flow. The sleeve 354 may have an angled outer surface 356 to enhance clearance within the valve body and/or to enhance assembly of the balanced pressure regulator. The sleeve 354 may also include one or more outer annular shoulders 358 that may be clamped between a bonnet and the valve body to locate and retain the sleeve 354 within the valve body.

A diaphragm 339 is connected to the sleeve 354 and to the valve plug 338. The diaphragm 339 separates a passage within the valve body from a cavity 340 between the balanced pressure regulator assembly 311 and the bonnet that contains a load spring 334. The diaphragm 339 is responsive to pressure differences between the passage within the valve body and the cavity 340.

The retainer 342 is attached to the valve stem 336 and operatively connects the valve plug 338 to the valve stem 336. The retainer 342 may include one or more fasteners 344, such as a nut, which are operatively connected to the valve stem 336. A center balancing passage channel 346a extends through at least one of the fastener 344 and the retainer 342 to fluidly connect the fluid passageway with a chamber 348 located between the valve plug 338 and the cavity 340. One or more peripheral balancing passages 346b are located between the retainer 342 and the valve plug 338 to fluidly connect the fluid passageway with the chamber 348. The peripheral balancing passages 346b vary in size, depending upon an inlet pressure, which will be discussed further below. Fluid forces on the valve plug 338 are balanced by fluid moving through the balancing channels 346a, 346b from higher pressure regions to lower pressure regions.

The retainer 342 is slidably attached to the fastener 344 so that the retainer 342 is longitudinally slidable within the valve plug 338. The fastener 344 includes an annular flange 352 to prevent the retainer 342 from sliding off of the fastener 344. The retainer 342 includes a hollow bore 355 that is sized and shaped to receive an outer surface of the fastener 344. A plug spring seat 357 is located between the retainer 342 and the valve plug 338 in a chamber 359 formed between the retainer 342 and the valve plug 338. The chamber 359 includes a first portion 360 and a second portion 362, the first portion 360 having a first diameter and the second portion 362 having a second diameter that is different from the first diameter. In some embodiments, the first diameter is larger than the second diameter. While the plug spring seat 357 is illustrated as being a separate element from the valve plug 338, in other embodiments, the plug spring seat 357 could be integrally formed with the valve plug 338.

The retainer 342 includes a retainer spring seat 364 formed on an outer surface thereof. The retainer spring seat 364 may be formed by a seat shoulder 366 that extends radially outward, away from the hollow bore 355. A pressure sensing spring 370 is disposed between the plug spring seat 357 and the retainer spring seat 364. The pressure sensing spring 370 biases the retainer 342 away from the plug spring seat 356. A peripheral annular flange 372 extends radially outward, away from the retainer 342. In some embodiments, the peripheral annular flange 372 includes a chamfered surface 374. The outer diameter of the peripheral annular flange 372 is substantially equal to the first diameter of the first portion 360 of the chamber 359 so that when the peripheral annular flange 372 is located within the first portion 360, fluid is prevented from flowing between the retainer 342 and the valve plug 338. On the other hand, when the peripheral annular flange 372 is located outside of the first portion 360 (e.g., when the pressure sensing spring 370 pushes the retainer 342 away from the valve plug 338), a gap exists between the peripheral annular flange 372 and the valve plug 338, which allows fluid to flow therebetween and into the chamber 359.

The pressure sensing spring 370 may be set so that the retainer 342 is biased to an open position, where the peripheral annular flange 372 is located completely outside of the chamber 359 at a minimum or low inlet pressure. This position corresponds to a fully open position that allows fluid to flow through the center balancing channel 346a and through the peripheral balancing channels 346b, which results in low droop at low inlet pressures. As a result, the disclosed balanced plug assembly 311 has increased fluid capacity at low inlet pressures relative to known center-sense balanced pressure regulators.

As fluid pressure at the inlet increases, a closing force will be generated by the fluid pressure pressing on the outer surface of the retainer 342. As the closing force begins to overcome the spring force generated by the pressure sensing spring 370, the retainer 342 will begin to move towards the plug spring seat 357. As the retainer 342 moves towards the plug spring seat 356, the peripheral annular flange 372 will enter the chamber 359. As the peripheral annular flange 372 enters the chamber 359, fluid flow through the peripheral balancing channels 346b will be reduced as the peripheral annular flange 372 becomes fully disposed within the chamber 359. At the fully closed position, wherein the peripheral annular flange 372 is fully seated within the chamber 359, fluid flow is substantially reduced from flowing through the peripheral balancing channels 346b. As a result, the disclosed balancing plug assembly 311 has low boost at high inlet pressures, which provides for increased fluid flow capacities at high inlet pressures relative to known edge-sense balanced pressure regulators. Although fluid flow through the peripheral balancing channels 346b is minimized at high inlet pressures, fluid continues to flow through both the peripheral balancing channels 346b and the center balancing channel 346a, making the balanced plug assembly 311 dual sense as long as the peripheral balancing channels 346b and the center balancing channel 346a remain unblocked.

Should the center balancing channel 346a become blocked or otherwise obstructed, as illustrated in FIG. 5B, the balanced plug assembly 311 continues to operate in the edge sense mode, by allowing fluid to flow through the peripheral balancing channels 346b. Thus, the balanced plug assembly 311 of FIGS. 5A-6 includes a fail-safe operating mode should the center balancing channel 346a become blocked or obstructed.

Any of the embodiments of balanced regulators or balanced plug assemblies disclosed herein may be used to advantageously provide low droop at low inlet pressures and low boost at high inlet pressures, thereby resulting in increased flow capacities throughout a range of inlet pressures from low to high.

Although certain balanced regulators and balanced plug assemblies have been described herein in accordance with the teachings of the present disclosure, the scope of coverage of this patent is not limited thereto. On the contrary, while the invention has been shown and described in connection with various preferred embodiments, it is apparent that certain changes and modifications, in addition to those mentioned above, may be made. This patent covers all embodiments of the teachings of the disclosure that fairly fall within the scope of permissible equivalents. Accordingly, it is the intention to protect all variations and modifications that may occur to one of ordinary skill in the art.

What is claimed is:

1. A balanced pressure regulator, comprising:
    a valve body having a fluid inlet and a fluid outlet connected by a fluid passageway;
    a valve seat disposed within the fluid passageway;
    a balanced plug assembly disposed within the fluid passageway, the balanced plug assembly comprising;
        a valve plug that cooperates with the valve seat to selectively open or close the fluid passageway;
        a retainer operatively connecting the valve plug to a valve stem;
        a diaphragm separating a chamber from the fluid passageway;
        a central balancing passage that fluidly connects the fluid passageway with the chamber; and
        a peripheral balancing passage that fluidly connects the fluid passageway with the chamber, the peripheral balancing passage being located between the retainer and the valve plug,
        wherein the retainer is movable relative to the valve plug along a longitudinal axis of the valve stem.

2. The balanced pressure regulator of claim 1, wherein the retainer is attached to the valve stem with a fastener.

3. The balanced pressure regulator of claim 2, wherein the central balancing passage extends through the fastener.

4. The balanced pressure regulator of claim 1, further comprising a pressure sensing spring disposed between the retainer and the valve plug.

5. The balanced pressure regulator of claim 4, wherein the pressure sensing spring biases the retainer away from the valve plug.

6. The balanced pressure regulator of claim 5, wherein further comprising a plug spring seat disposed between the retainer and the valve plug.

7. The balanced pressure regulator of claim 6, wherein the plug spring seat includes a balancing passageway.

8. The balanced pressure regulator of claim 1, wherein the retainer includes an outwardly extending flange.

9. The balanced pressure regulator of claim 8, wherein the outwardly extending flange includes a chamfered surface.

10. The balanced pressure regulator of claim 1, wherein the valve plug includes a central bore having a first portion with a first diameter and a second portion having a second diameter, the first diameter being larger than the second diameter.

11. A balanced plug assembly for a balanced pressure regulator, the balanced plug assembly comprising:
    a retainer operatively connecting the valve plug to a valve stem;
    a diaphragm separating a chamber from the fluid passageway;
    a central balancing passage that fluidly connects the fluid passageway with the chamber; and
    a peripheral balancing passage that fluidly connects the fluid passageway with the chamber, the peripheral balancing passage being located between the retainer and the valve plug,
    wherein the retainer is movable relative to the valve plug along a longitudinal axis of the valve stem.

12. The balanced pressure regulator of claim 11, wherein the retainer is attached to the valve stem with a fastener.

13. The balanced pressure regulator of claim 12, wherein the central balancing passage extends through the fastener.

14. The balanced pressure regulator of claim 11, further comprising a pressure sensing spring disposed between the retainer and the valve plug.

15. The balanced pressure regulator of claim 14, wherein the pressure sensing spring biases the retainer away from the valve plug.

16. The balanced pressure regulator of claim 15, wherein further comprising a plug spring seat disposed between the retainer and the valve plug.

17. The balanced pressure regulator of claim 16, wherein the plug spring seat includes a balancing passageway.

18. The balanced pressure regulator of claim 11, wherein the retainer includes an outwardly extending flange.

* * * * *

UNITED STATES PATENT AND TRADEMARK OFFICE
CERTIFICATE OF CORRECTION

PATENT NO. : 9,678,516 B2
APPLICATION NO. : 14/625006
DATED : June 13, 2017
INVENTOR(S) : Guolei Fan et al.

It is certified that error appears in the above-identified patent and that said Letters Patent is hereby corrected as shown below:

In the Specification

Column 4, Line 13, "regulator" should read -- regulator; --.

Column 7, Line 56, "seat 356." should read -- seat 357. --.

Column 8, Line 22, "seat 356," should read -- seat 357, --.

In the Claims

Column 10, Line 12 (Claim 11), "the fluid passageway" should read -- a fluid passageway --.

Column 10, Line 21 (Claim 12), "The balanced pressure regulator" should read -- The balanced plug assembly --.

Column 10, Line 23 (Claim 13), "The balanced pressure regulator" should read -- The balanced plug assembly --.

Column 10, Line 25 (Claim 14), "The balanced pressure regulator" should read -- The balanced plug assembly --.

Column 10, Line 28 (Claim 15), "The balanced pressure regulator" should read -- The balanced plug assembly --.

Column 10, Line 31 (Claim 16), "The balanced pressure regulator" should read -- The balanced plug assembly --.

Column 10, Line 34 (Claim 17), "The balanced pressure regulator" should read -- The balanced plug assembly --.

Signed and Sealed this
Sixth Day of August, 2019

Andrei Iancu
*Director of the United States Patent and Trademark Office*

Column 10, Line 36 (Claim 18), "The balanced pressure regulator" should read -- The balanced plug assembly --.